United States Patent
Peace et al.

(10) Patent No.: US 11,383,853 B2
(45) Date of Patent: Jul. 12, 2022

(54) COOLING

(71) Applicant: ROLLS-ROYCE plc, London (GB)

(72) Inventors: Richard Peace, Derby (GB); Adam Newman, Derby (GB)

(73) Assignee: ROLLS-ROYCE PLC, London (GB)

( * ) Notice: Subject to any disclaimer, the term of this patent is extended or adjusted under 35 U.S.C. 154(b) by 524 days.

(21) Appl. No.: 16/437,263

(22) Filed: Jun. 11, 2019

(65) Prior Publication Data
US 2020/0010208 A1    Jan. 9, 2020

(30) Foreign Application Priority Data
Jul. 5, 2018  (GB) ..................................... 1811040

(51) Int. Cl.
| | |
|---|---|
| *B64D 33/08* | (2006.01) |
| *B64D 27/24* | (2006.01) |
| *F04D 29/58* | (2006.01) |
| *F04D 25/08* | (2006.01) |
| *B64D 33/02* | (2006.01) |

(52) U.S. Cl.
CPC ............. *B64D 33/08* (2013.01); *B64D 27/24* (2013.01); *F04D 25/082* (2013.01); *F04D 29/584* (2013.01); *F04D 29/5806* (2013.01); *B64D 2033/0266* (2013.01)

(58) Field of Classification Search
None
See application file for complete search history.

(56) References Cited

U.S. PATENT DOCUMENTS

| | | |
|---|---|---|
| 2010/0212857 A1 | 8/2010 | Bulin et al. |
| 2015/0152789 A1* | 6/2015 | Thomas ................. F02K 3/025 |
| | | 415/144 |

(Continued)

FOREIGN PATENT DOCUMENTS

| | | |
|---|---|---|
| EP | 2 774 853 A1 | 9/2014 |
| GB | 2 131 094 A | 6/1984 |

(Continued)

OTHER PUBLICATIONS

Nov. 26, 2019 Extended Search Report issued in European Patent Application No. 19179248.0.

(Continued)

*Primary Examiner* — Timothy D Collins
*Assistant Examiner* — Rodney M Henry
(74) *Attorney, Agent, or Firm* — Oliff PLC

(57) ABSTRACT

An electric propulsion unit (102) for an aircraft is shown. A fan (202) produces a pressured airflow (P) by raising the pressure of an incident airflow (I). An electric machine (201) is arranged to drive the fan and is located within a casing (204). A primary cooling circuit (205) is located within the casing, and includes the electric machine and a first pass of a fluid-fluid heat exchanger (208), thereby placing the electric machine and the fluid-fluid heat exchanger in thermal communication. A secondary cooling circuit includes a second pass of the fluid-fluid heat exchanger and an air-fluid heat exchanger (210) located within the pressurised airflow produced by the fan, thereby placing the fluid-fluid heat exchanger and the air-fluid heat exchanger in thermal communication.

11 Claims, 5 Drawing Sheets

(56) References Cited

U.S. PATENT DOCUMENTS

| | | | | |
|---|---|---|---|---|
| 2015/0377132 A1* | 12/2015 | Caruel | ................... | B64D 33/02 |
| | | | | 415/116 |
| 2016/0137305 A1 | 5/2016 | Joubert et al. | | |
| 2017/0184028 A1* | 6/2017 | Sennoun | ................... | F02C 7/12 |
| 2017/0211474 A1* | 7/2017 | Sennoun | ................... | F02C 6/00 |
| 2018/0050811 A1 | 2/2018 | Niergarth et al. | | |
| 2018/0051716 A1* | 2/2018 | Cheung | ................... | F04D 25/06 |
| 2019/0203644 A1* | 7/2019 | Niergarth | ................... | F02C 7/22 |

FOREIGN PATENT DOCUMENTS

| | | |
|---|---|---|
| GB | 2 552 342 A | 1/2018 |
| WO | 2018/089067 A2 | 5/2018 |

OTHER PUBLICATIONS

Dec. 5, 2018 Search Report issued in British Patent Application No. 1811040.3.

Apr. 23, 2021 Office Action issued in European Patent Application No. 19 179 248.0.

\* cited by examiner

COOLING

TECHNICAL FIELD

This disclosure relates to cooling of electric propulsion units for aircraft.

BACKGROUND

Hybrid and fully electric propulsion systems for aircraft are currently being developed, in which an electric machine is connected with a propulsive fan (a term which will be understood by those skilled in the art to embrace ducted fans, propfans, open propellers, shrouded propellers, and single stage or contra-rotating variations of each) for generating thrust.

Due to the high levels of power required to propel such aircraft, typically of the order of megawatts, large quantities of heat are generated in the electric machine, despite efficiencies in excess of, for example, 95 percent. This waste heat must be recovered or rejected, but in a manner that does not compromise safety.

SUMMARY

In an aspect, an electric propulsion unit comprises a fan configured to produce a pressured airflow by raising the pressure of an incident airflow. An electric machine is arranged to drive the fan and is located within a casing. A primary cooling circuit is located within the casing, and includes the electric machine and a first pass of a fluid-fluid heat exchanger, thereby placing the electric machine and the fluid-fluid heat exchanger in thermal communication. A secondary cooling circuit includes a second pass of the fluid-fluid heat exchanger and an air-fluid heat exchanger located within the pressurised airflow produced by the fan, thereby placing the fluid-fluid heat exchanger and the air-fluid heat exchanger in thermal communication.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
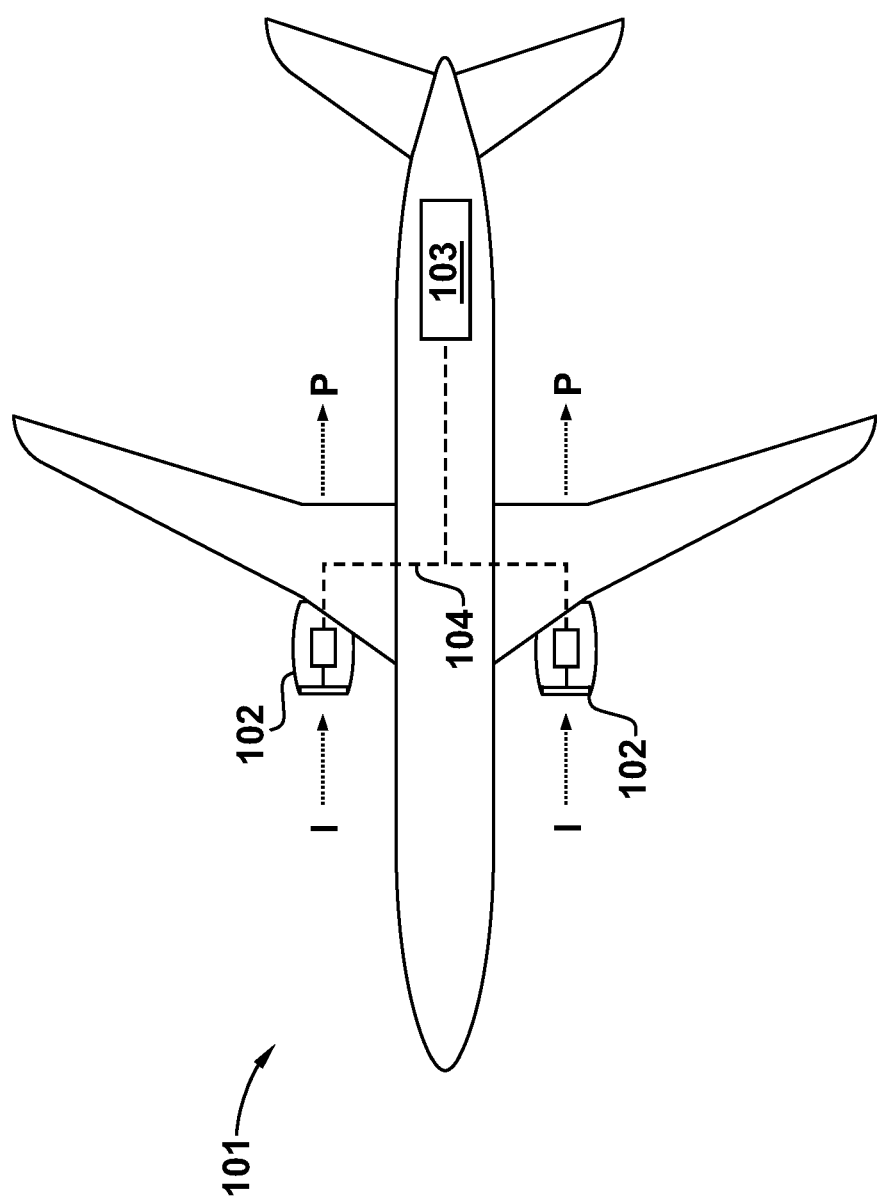
FIG. 1 shows an aircraft of an embodiment, including an electric propulsion unit.

FIG. 1 illustrates an aircraft 101 powered by electric propulsion units 102 in combination with an electrical generation unit 103.

In the present embodiment, two electric propulsion units 102 are provided on the aircraft 101, although it will be appreciated that a greater number, such as for example four or six, may be provided in a distributed propulsion implementation, or alternatively only one should that be all that is required.

In the present embodiment, the electric propulsion units 102 generate thrust for the aircraft 101 by utilising electric motors to drive propulsive fans. In operation, the fans perform work on the incident airflow I to raise the pressure thereof, producing a pressurised airflow P. This pressure rise results in the generation of a net forward thrust upon the aircraft 101.

As set out previously, the term "fan" as used herein should be understood to embrace various configurations able to produce thrust by causing a pressure rise in the incident airflow, such as ducted fans and open propellers, amongst others. The configuration of the electric propulsion units 102 will be described further with reference to FIG. 2.

In the present embodiment, the electrical generation unit 103 includes an internal combustion engine in combination with an electrical generator. In a specific embodiment, the electrical generation unit 103 is configured as a turboelectric generator, in which the internal combustion engine is a gas turbine engine. Alternatively, the internal combustion engine could be a piston engine, such as a diesel engine, or any other type of internal combustion engine.

In an alternative configuration, the aircraft 101 does not include an electrical generation unit 103, but instead includes an energy storage system, such as a battery pack, and hence is fully electric.

Electrical power is distributed by a bus 104 from the electrical generation unit 103 to the electric propulsion units 102. It will be appreciated that in practice the bus 104 may include conductors, power electronics, and may possibly include energy storage systems such as batteries or flywheels to provide extra capacity.

Figure 2:
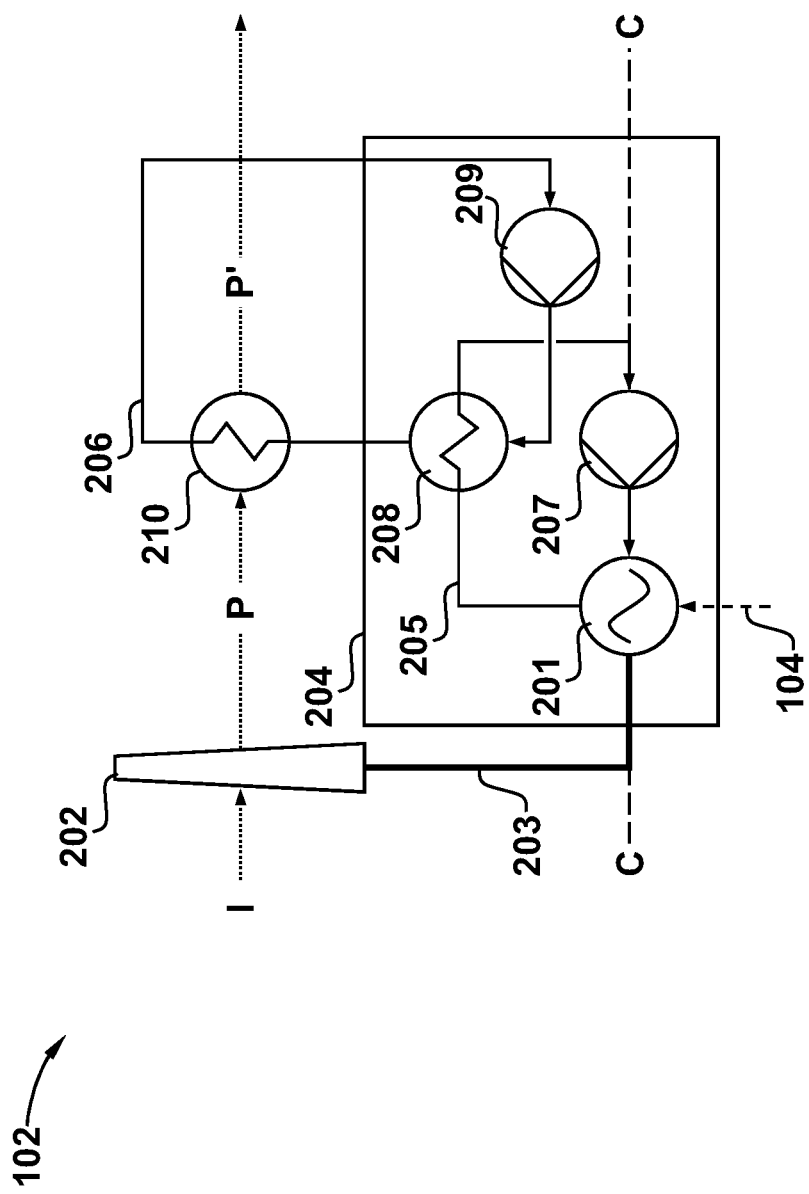
FIG. 2 shows the electric propulsion unit of FIG. 1 in schematic form.

One of the electric propulsion units 102 is illustrated in schematic form in FIG. 2 in which only the half above the centreline C-C is shown for simplicity.

As described previously, in the present example the electric propulsion units 102 each include an electric machine 201 which drives a fan 202 around a centreline C-C. The electric machine 201 is connected to the fan 202 via a fan shaft 203. In the present embodiment, the electric machine 201 drives the fan directly via the fan shaft 203, but in alternative embodiments a gearbox, such as an epicyclic gearbox, compound idler gearbox, or similar, may be used to couple the electric machine 201 to the fan 202. The gearbox may operate as a reduction or step up gearbox depending upon the desired speed of the fan 202, and the desired speed of the electric machine 201.

The electric machine 201 receives electrical power via the bus 104.

In the present example, the electric machine 201 is an interior rotor, permanent magnet radial flux ac machine. As will be appreciated by those skilled in the art, though, other machine types, such as those which use one or more of exterior rotor, induction, axial flux, dc, etc. configurations may be used.

As shown in the Figure, a casing 204 is provided to enclose the electric machine 201. One function of the casing 204 is to provide protection in the event of foreign object damage, such as bird strike or hail ingestion.

The pressurised airflow P is used for both thrust in a manner that will be understood by those skilled in the art, and also for cooling the electric machine 201. To achieve this, the electric propulsion unit 102 comprises a primary cooling circuit 205 and a secondary cooling circuit 206.

The primary cooling circuit 205 includes the electric motor 201, a primary circuit pump 207, and a first pass of a fluid-fluid heat exchanger 208. Thus, the primary cooling circuit 205 places the electric motor 201 and the fluid-fluid heat exchanger 208 in thermal communication.

In a specific embodiment, the fluid-fluid heat exchanger 208 is a plate heat exchanger, but other types such as shell and tube may be suitable. A fluid coolant is circulated to remove heat from the electric motor 201 and transfer it to the fluid-fluid heat exchanger 208. The primary cooling circuit 205 is located within the casing 204.

In the present example, both the stator and the rotor of the electric motor 201 are cooled by fluid in direct contact therewith. Thus, heat generated in the coils in the stator and in the permanent magnets in the rotor is removed by fluid in direct contact therewith. Thus in this configuration, the fluid within the primary cooling circuit 205 is a dielectric fluid, such as Midel® 7131 available from M&I Materials Ltd of Manchester, England, which is a synthetic ester-based coolant with a dielectric strength of 29.5 megavolts per metre. Alternative dielectric fluids may be used, such as FC-3283 available from 3M Specialty Materials of St. Paul, Minn., USA, which is a fully-fluorinated coolant with a dielectric strength of 17 megavolts per meter. It will be appreciated that any other fluid with suitable dielectric strength and heat capacity for the application may be used.

In an alternative embodiment, the electric motor 201 has a fluid jacket for cooling, with heat transferring into the primary cooling circuit 205 by conduction, thereby allowing the use of conductive fluids.

The primary circuit pump 207 circulates the fluid such that heat is carried through the first pass of the fluid-fluid heat exchanger 208. This heat exchanger includes a second pass which forms part of the secondary cooling circuit 205. Thus, in operation, heat is exchanged from the primary cooling circuit into the secondary cooling circuit through the fluid-fluid heat exchanger 208.

In addition to the second pass of the fluid-fluid heat exchanger 208, the secondary cooling circuit 206 includes a secondary circuit pump 209 and an air-fluid heat exchanger 210. Thus, the secondary cooling circuit 206 places the fluid-fluid heat exchanger 208 and the air-fluid heat exchanger 210 in thermal communication.

The air-fluid heat exchanger 210 is located within the pressurised airflow P produced by the fan 202. In a specific embodiment, the air-fluid heat exchanger 210 is a plate-fin heat exchanger, but other heat exchanger types, such as shell and tube may be suitable. In a specific embodiment, the secondary cooling circuit 206 uses an oil as the cooling fluid, but other fluid types, such as water, may be used.

In an embodiment, the secondary cooling circuit 206 may also be used for heat rejection from other source of heat within the electric propulsion unit 102.

In operation, fluid within the secondary cooling circuit 206 is circulated by the secondary circuit pump 209 from the fluid-fluid heat exchanger 208 to the air-fluid heat exchanger 210, where heat may be rejected into the pressurised airflow P, which exits the heat exchanger with an increased enthalpy as an airflow P'.

It will apparent that this arrangement presents several advantages.

First, it allows different fluids to be used in each cooling circuit—for example the primary cooling circuit may require a fluid with a very high dielectric strength as it is in direct contact with conductors in the electric machine 201, whilst in the secondary cooling circuit this requirement may be relaxed.

Second, it allows the fluids to operate at different pressures and circulation rates in each cooling circuit—for example the fluid used in the primary cooling circuit may be pressurised so as to raise its boiling point.

Third, the location of the primary cooling circuit 205 within the casing 204 protects it from foreign object damage that it would otherwise be exposed to if its heat exchanger were located in the incident airflow I or in the pressurised airflow P. This allows the use of high-performance fluids in the primary cooling circuit 205 which, however, due to their volatility could pose a risk to safety if they were to leak due to foreign object damage.

Figure 3:
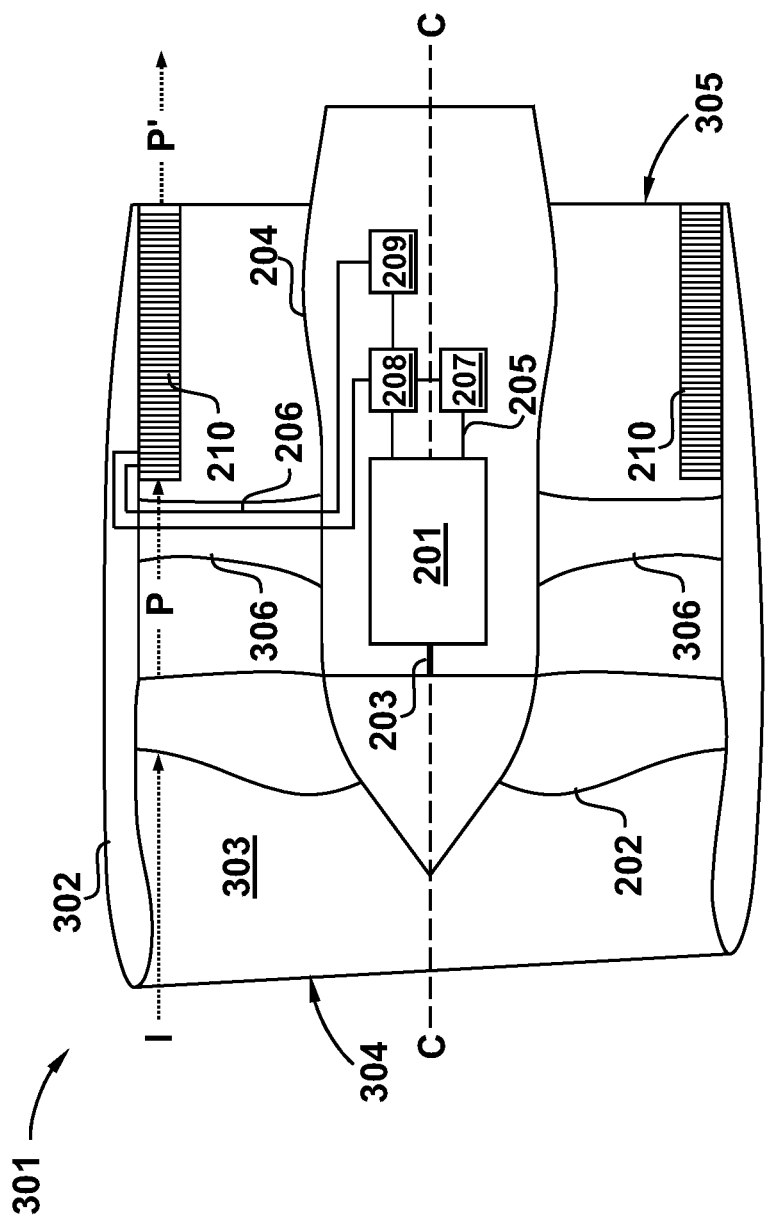
FIG. 3 shows a practical implementation of the electric propulsion unit of FIG. 2.

FIG. 3 illustrates a practical approach to incorporating the system of FIG. 2 into a ducted fan-type electric propulsion unit 301.

The electric propulsion unit 301 comprises a nacelle 302 which, in combination with the casing 204, defines a duct 303 having an inlet 304 and a nozzle 305. The nacelle 302 and casing 204 are, in this example, substantially axisymmetric around the centreline C-C, save for the use of a scarf to the inlet 304 of the known type.

In this exemplary configuration, the fan 202 is configured as a wide-chord swept fan located in the duct 303, with, in this example, structural outlet guide vanes 306 provided to remove swirl and increase static pressure in the pressurised airflow P produced by the fan 202.

The primary cooling circuit 205 is, as described previously, located within the casing 204. The secondary cooling circuit 206 receives heat via the fluid-fluid heat exchanger 208, and transfers it to the air-fluid heat exchanger 210, which in this implementation is located proximal to the outer periphery of the duct 303, i.e. on the inner surface of the nacelle 302.

In the present example, the secondary cooling circuit 206 traverses the duct 303 via one or more of the outlet guide vanes 306, although it will be appreciated that other routing options may be considered. In the present example, the air-fluid heat exchanger 210 is substantially annular around the centreline C-C. This may reduce the aerodynamic impact of its presence in the duct 303. The air-fluid heat exchanger 210 may, however, take other forms if required.

In an alternative embodiment, the air-fluid heat exchanger 210 may be mounted proximal to the inner periphery of the duct 303, i.e. on the outer surface of the casing 204. This may assist in reducing the installation complexity of the secondary cooling circuit 206, which will not need to traverse the duct 303.

Figure 4:
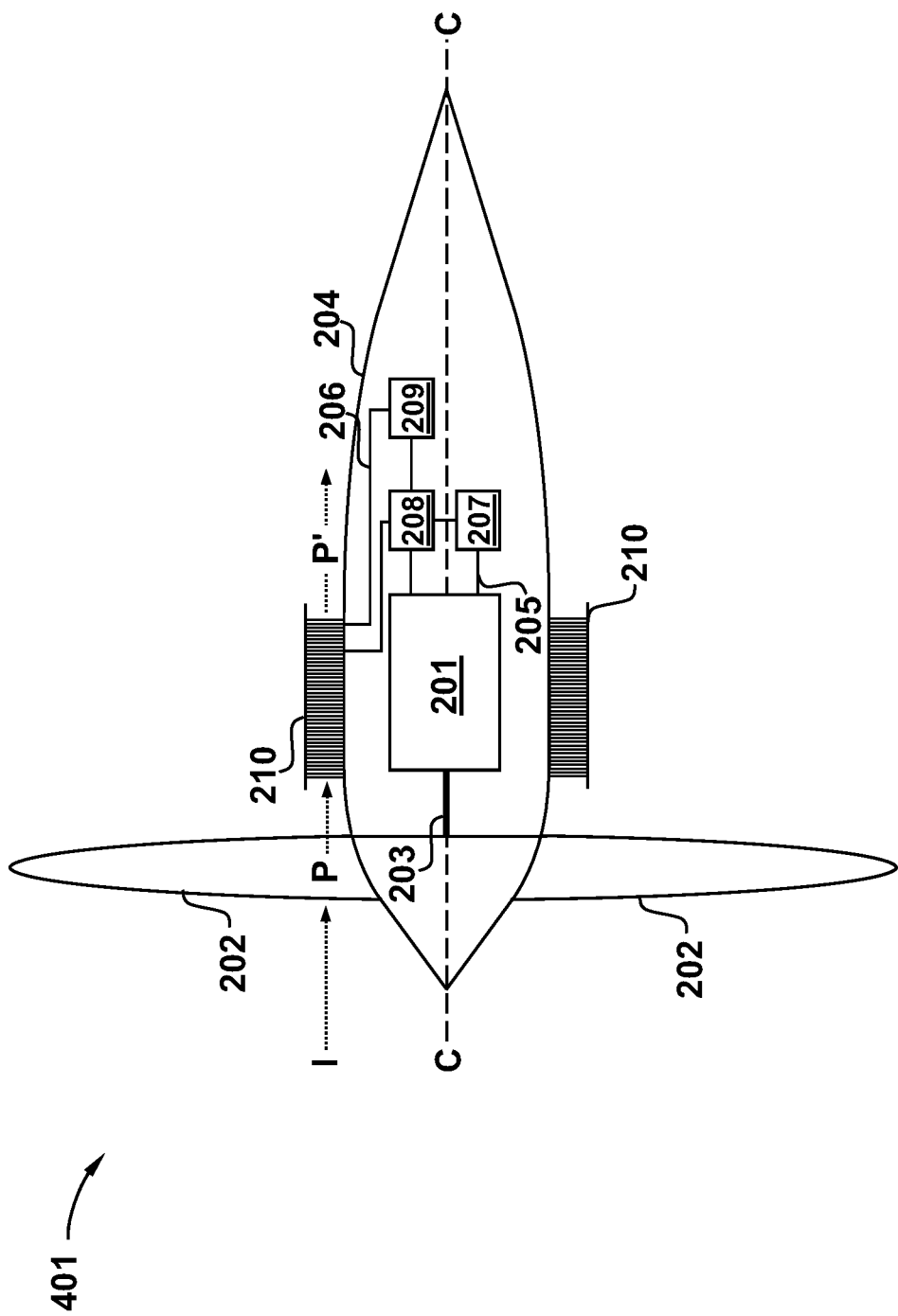
FIG. 4 shows another practical implementation of the electric propulsion unit of FIG. 2.

FIG. 4 illustrates a practical approach to incorporating the system of FIG. 2 into an open propeller-type electric propulsion unit 401.

In this exemplary configuration, the fan 202 is configured as a propeller. The primary cooling circuit 205 is, as with the embodiment of FIG. 3, located within the casing 204. The casing in the present example is substantially axisymmetric around the centreline C-C.

The secondary cooling circuit 206 receives heat via the fluid-fluid heat exchanger 208, and transfers it to the air-fluid heat exchanger 210, which in this implementation is mounted on the outside of the casing 204. As with the embodiment of FIG. 3, the air-fluid heat exchanger 210 in this implementation be annular around the casing 204

In both the examples of FIG. 3 and FIG. 4, the air-fluid heat exchanger 210 may be one of a plurality of air-fluid heat exchangers forming part of one or more auxiliary cooling circuits for rejecting heat generated by other engine components, such as bearing, pump and gearbox lubrication systems, etc. In such a case, the air-fluid heat exchanger 210 may form one sector of an annulus, with the remainder of the annulus being made up of one or more air-fluid heat exchangers for the auxiliary cooling circuit(s).

Figure 5:
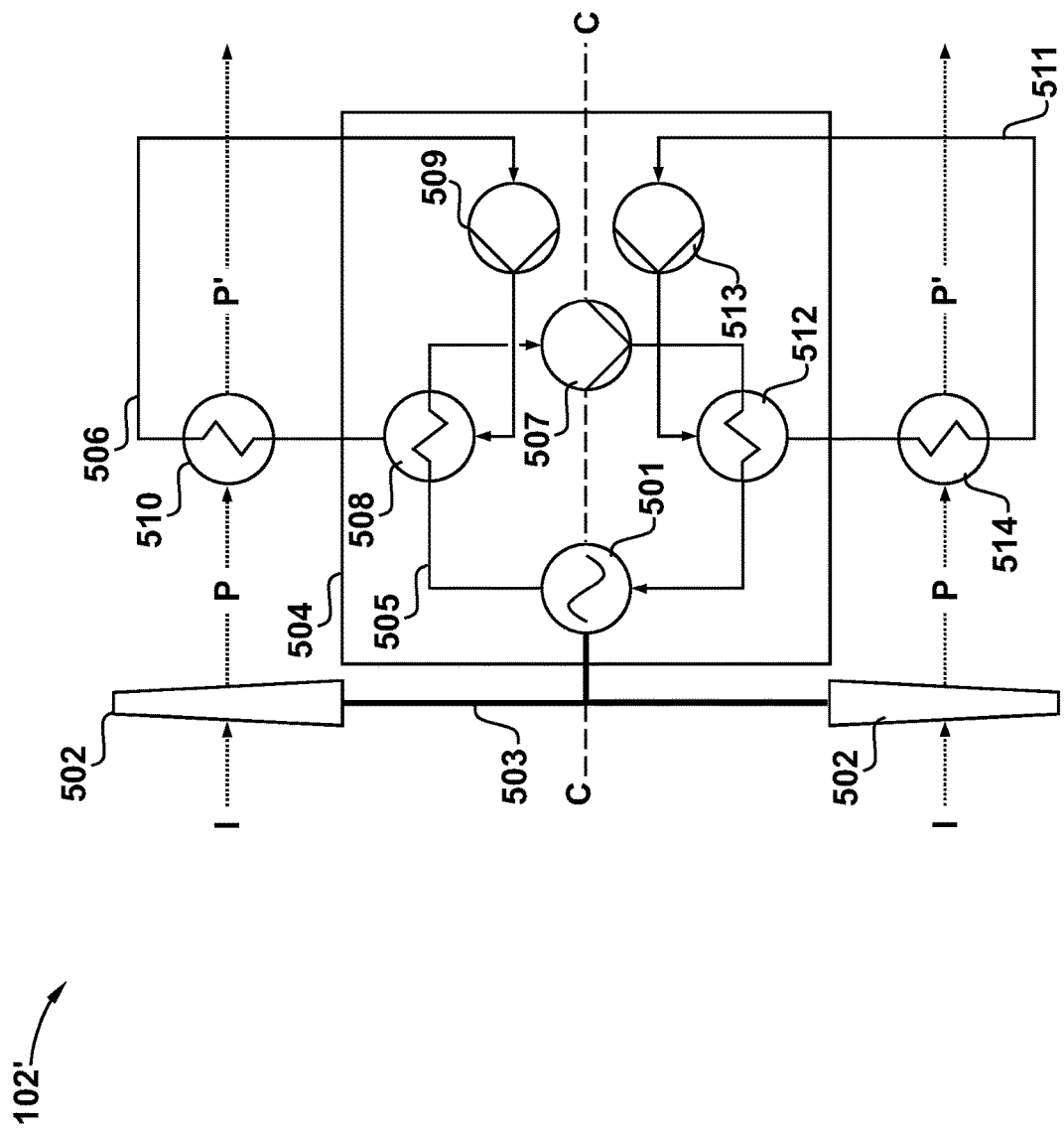
FIG. 5 shows a variation of the electric propulsion unit of FIG. 2.

FIG. 5 shows a variant 102' of the electric propulsion unit first described with reference to FIG. 2, in which common features are indicated with the like reference numerals, albeit beginning with 5 rather than 2. For completeness, FIG. 5 shows both halves of the electric propulsion unit 102' around the centreline C-C. This variant introduces a degree of redundancy via the inclusion of a second secondary cooling circuit 511 to complement the first secondary cooling circuit 506.

The primary cooling circuit 505 includes, in addition to fluid-fluid heat exchanger 508, a first pass of a second fluid-fluid heat exchanger 512. The second secondary cooling circuit 511 includes the second pass of the second fluid-fluid heat exchanger 512. Fluid is circulated in the second secondary cooling circuit 511 by means of a second secondary circuit pump 513, which circulates fluid to a second air-fluid heat exchanger 514.

In a similar way to air-fluid heat exchanger 210, the two air-fluid heat exchangers 510 and 514 are located within the pressurised airflow P produced by the fan 502, rejecting heat thereto. As described previously with reference to FIG. 3, the two air-fluid heat exchangers 510 and 514 may respectively take the form of sectors of an annulus, possibly in combination with other auxiliary air-fluid heat exchangers.

Thus, in practice, should one of the air-fluid heat exchangers 510 and 514 become damaged or one of the two secondary cooling circuits 506 and 511 become otherwise inoperable, cooling may still be provided for the electric machine 501 by the other, operational secondary cooling circuit. Measures may be taken to increase the rate of circulation of fluid to allow continued operation, or the electric machine 501 may be derated. However, this still allows for continued operation of the electric propulsion unit 102' in such a scenario, rather than a complete failure to continue to produce thrust.

Various examples have been described, each of which has various combinations of features. It will be appreciated by those skilled in the art that, except where clearly mutually exclusive, any of the features may be employed separately or in combination with any other features and this disclosure extends to and includes all combinations and sub-combinations of one or more features described herein.

The invention claimed is:

1. An electric propulsion unit for an aircraft, comprising:
a fan configured to produce a pressured airflow by raising the pressure of an incident airflow;
an electric machine arranged to drive the fan and which is located within a casing;
a primary cooling circuit located within the casing, and including the electric machine and a first pass of a fluid-fluid heat exchanger, thereby placing the electric machine and the fluid-fluid heat exchanger in thermal communication;
a secondary cooling circuit including a second pass of the fluid-fluid heat exchanger and an air-fluid heat exchanger located within the pressurised airflow produced by the fan, thereby placing the fluid-fluid heat exchanger and the air-fluid heat exchanger in thermal communication.

2. The electric propulsion unit of claim 1, in which the fan is a ducted fan, and the electric propulsion unit comprises a nacelle defining a duct in which said fan is located.

3. The electric propulsion unit of claim 2, in which the air-fluid heat exchanger is mounted proximal to an outer periphery of the duct.

4. The electric propulsion unit of claim 2, in which the air-fluid heat exchanger is mounted proximal to an inner periphery of the duct.

5. The electric propulsion unit of claim 1, in which the fan is an open propeller.

6. The electric propulsion unit of claim 5, in which the air-fluid heat exchanger is mounted on the outside of the casing.

7. The electric propulsion unit of claim 1, in which the air-fluid heat exchanger is substantially annular.

8. The electric propulsion unit of claim 1, in which the electric propulsion unit further comprises one or more auxiliary cooling circuits each having respective air-fluid heat exchangers, such that the electric propulsion unit has a plurality of air-fluid heat exchangers located within the pressurised airflow produced by the fan.

9. The electric propulsion unit of claim 1, in which each one of said plurality of air-fluid heat exchangers forms a respective sector of the same annulus.

10. The electric propulsion unit of claim 1, in which the fluid-fluid heat exchanger is a first fluid-fluid heat exchanger, and the primary cooling circuit further includes a first pass of a second fluid-fluid heat exchanger; and
the secondary cooling circuit is a first secondary cooling circuit, and the electric propulsion unit further comprises a second secondary cooling circuit including a second pass of the second fluid-fluid heat exchanger and a second air-fluid heat exchanger located within the pressurised airflow produced by the fan, thereby placing the second fluid-fluid heat exchanger in thermal communication with the second air-fluid heat exchanger.

11. An aircraft including one or more electric propulsors according to claim 1.

* * * * *